Figure 1:
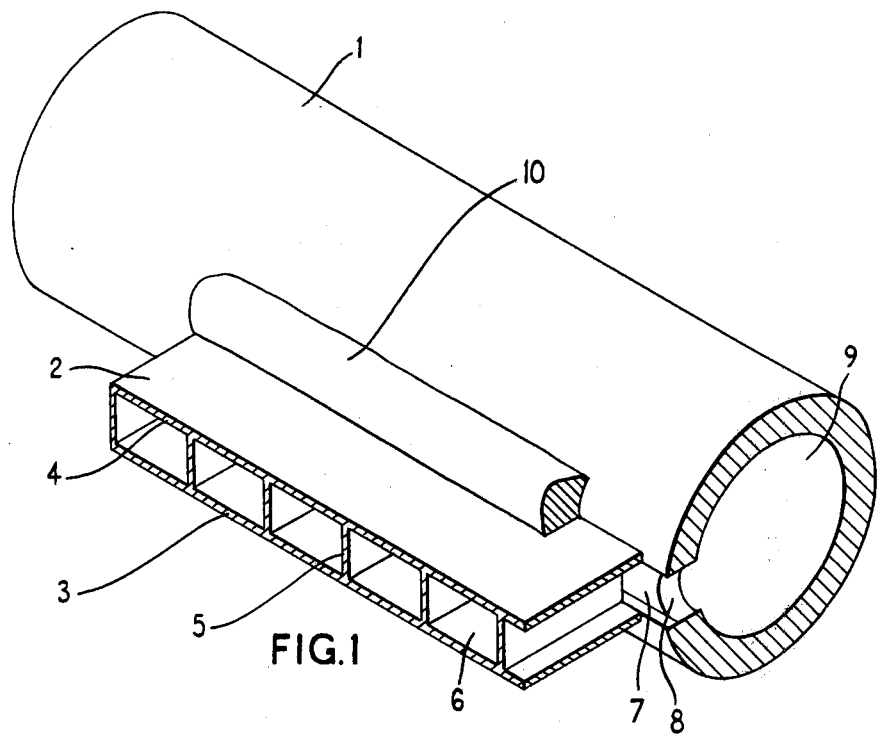

United States Patent [19]

Brackman

[11] 4,150,720
[45] Apr. 24, 1979

[54] HEAT EXCHANGER

[75] Inventor: Derek S. Brackman, Stanmore, England

[73] Assignee: Imperial Chemical Industries Limited, London, England

[21] Appl. No.: 790,002

[22] Filed: Apr. 22, 1977

[30] Foreign Application Priority Data

Apr. 29, 1976 [GB] United Kingdom ............... 17492/76
Oct. 12, 1976 [GB] United Kingdom ............... 42317/76
Dec. 1, 1976 [GB] United Kingdom ............... 50093/76

[51] Int. Cl.² .............................. F28F 3/12; F24J 3/02
[52] U.S. Cl. .................................... 165/170; 126/271; 165/174
[58] Field of Search ....................... 165/170, 171, 174; 126/270, 271

[56] References Cited

U.S. PATENT DOCUMENTS

| | | | |
|---|---|---|---|
| 3,039,453 | 6/1962 | Andrassy | 126/271 |
| 3,934,323 | 1/1976 | Ford et al. | 165/170 |
| 3,987,784 | 10/1976 | Godrick | 126/271 |
| 4,031,881 | 6/1977 | Thiel | 126/271 |
| 4,060,070 | 11/1977 | Harter | 126/271 |

FOREIGN PATENT DOCUMENTS 645802 9/1962 Italy ........................................ 165/170

*Primary Examiner*—Sheldon J. Richter
*Attorney, Agent, or Firm*—Cushman, Darby & Cushman

[57] ABSTRACT

A heat exchanger of thermoplastic materials, e.g. polypropylene, comprises two spaced-apart headers interconnected by an extruded board comprising a plurality of tubular passages extending from one end of the board to the other; each header having a longitudinal groove in its exterior surface and a plurality of holes spaced along the groove, interconnecting the groove and the interior of the header; each end of the board being located along the groove of one of the headers and held in position by a sealing bead adhering to both the header and the board, the bead extending continuously right round the mouth of the groove where adjacent to the board, to seal against loss of any fluid flowing between the header and the tubular passages. The heat exchanger can be readily adapted for use as a solar energy collector. The board and headers are preferably polypropylene extrusions secured together and sealed by extrusion welding using an extruded bead of a polypropylene composition.

10 Claims, 7 Drawing Figures

HEAT EXCHANGER

The invention relates to heat exchangers of thermoplastics materials.

The invention provides a heat exchanger of thermoplastics material comprising two spaced-apart headers interconnected by an extruded board having a profile comprising a plurality of tubular passages extending from one end of the board to the other; each tubular header having a longitudinal groove in its exterior surface and a plurality of holes spaced along the groove, the holes interconnecting the groove and the interior of the header; each end of the board being located along the groove of one of the headers; each header being held in position by a sealing bead adhering to both the header and the board, and extending continuously right round the mouth of the groove where covered by the board, to seal against loss of any fluid flowing between the header and the tubular passages of the board.

When operating this heat exchanger, the two headers are connected to an external circuit and the system filled with a suitable fluid, such as water. The fluid is then caused to flow from the external circuit into one header, through the holes, and thence into and along the plurality of tubular passages in the extruded board where it either picks up or loses heat to the environment. At the other end of the tubular passages, the fluid flows through the holes into that other header, and eventually out into the external circuit again. The fluid may suitably be caused to circulate by a pump, although in some applications, thermo-siphoning effects due to the temperature difference across the heat exchanger, may be sufficient.

The heat exchangers may be used singly or a plurality of similar exchangers may be connected together to form an array. For efficient working, it is desirable to have uniform flow through all the tubular passages, and this also applies throughout a full array of such heat exchangers. This uniform even flow may be achieved in a flat panel by using a diagonal flow pattern with the fluid entering at one end of one header and leaving from the opposite end of the other header. Uniform distribution of the fluid to the various tubular passages along the width of the board may be assisted by leaving the grooves sufficiently clear to permit free flow of fluid along them. This may be achieved by mounting the board at the mouth of the groove. However, it is difficult in practice to extrude the sealing bead forcibly into contact with both the board and the header while maintaining their alignment and also while ensuring that the sealing material does not enter the groove or the ends of the tubular passages, with consequent restriction (or even complete blockage) of fluid flow during use. These problems can be avoided by inserting the ends of the board at least part-way into the header grooves to provide positive location and avoid ingress of sealer, and such heat exchangers are preferred. Free flow of fluid along the groove may still be achieved by preventing the board from reaching the base of the groove (e.g. by using a groove whose width at its mouth is sufficient to accommodate the end of the board but which narrows e.g. stepwise or by tapering, to a width insufficient to accommodate the board at a point part-way between the mouth of the groove and its base, or by inserting temporary water-soluble spacers at the base of the groove) or by shaping the end of the board such that part thereof is held clear of the base of the groove to allow free flow of fluid along the groove, by a further part thereof which extends to the base of the groove.

In constructing the heat exchanger, it is desirable to avoid restricting the flow of the fluid through it. There are various reasons for this. Thus, for example, a restricted flow requires more energy, and indeed, adequate circulation of the fluid by thermo-siphon effects alone may be prevented if flow is restricted. Restricted passages are more likely to become blocked during use, and it would be more difficult to obtain uniform flow because it would then be necessary to ensure that the restrictions were all the same for each tubular passage, because without restrictions or other such adverse factors, the diagonal flow pattern tends to give a substantially uniform flow pattern across the board.

The total area of the holes spaced along the length of the header groove, is therefore preferably sufficient to permit fluid to flow at a rate sufficient for the particular application without substantially restricting the flow. The holes may be round, formed for example by drilling, or they may be elongated to form slots where a greater area is required. However, as there are a plurality of holes according to this invention, there must necessarily be at least one (and preferably many more) portion between the holes, bridging between the two sides of the groove. The purpose of these bridging portions is to carry the stresses within the headers, rather than transfer them to the relatively thin sections of the board. Preferred holes are rectangular-sectioned, and arranged with adjacent sides substantially parallel. The rectangular-sectioned holes provide a larger flow passage area for any specific width of bridging portion than corresponding circular holes. For particularly arduous conditions it is preferred to provide rectangular holes with one side longer than the other, the holes being aligned with their longer sides adjacent. For most applications, substantially square-sectioned holes are suitable, and for lower stress conditions, the holes may be elongated along the direction of the line of holes.

At the interface between the ends of the tubular passages and the adjacent surface of the header where the holes emerge, the total area of the flow passage cross-section will be reduced by the thickness of both the bridging portions and the webs unless there is complete coincidence between them, unless the structure is proportioned to avoid that. Hence in a preferred heat exchanger the bridging portions are narrowed substantially to a knife edge at their outer surface. The internal width of the tubular passages from one side of the board to the other is also preferably less than the width of the holes through the header by an amount such that the total cross-sectional area of the holes is substantially equal to or greater than the total cross-sectional area of the tubular passages. By reducing the thickness of the bridging portions to a knife edge, there is no significant reduction of the flow passage area at the interface which might otherwise cause some restriction in flow. Likewise by broadening the holes, reduction in the flow passage area may be avoided while allowing adequate bridging material for carrying the stresses within the header pipe.

The knife edge may be obtained by tapering the holes over the full thickness of the header wall. However, it is preferred to merely chamfer the bridging portions at their outer surface so as to provide the maximum quantity of material in each bridging portion while still avoiding restriction of the flow. The chamfer may be on one or both sides of the bridging portion, a unilateral chamfer being preferred.

The boards may be extruded in the manner described in British patent specification No. 1 042 732, wherein FIGS. 1 to 4 show various board profiles, each of which comprises tubular passages extending from one end of the board to the other, and could be used in the present application. However, as thermoplastics materials are generally of low thermal conductivity, it is preferable for the board to have a profile which minimises the amount of conduction required to dissipate the heat over the surface of the board or to collect heat from all over the surface. Preferred configurations of the four shown therein are those of FIG. 1 wherein the tubular passages are substantially square in section, and FIG. 4 wherein the passages each have a domed roof and thicker-sectioned webs between the passages. These configurations are also illustrated in FIGS. 1 and 5 respectively of the accompanying drawings.

The heat exchanger may be used for extracting heat from its environment, e.g. as a solar energy collector. For this application the headers and especially the board may be extruded from a thermoplastics material (preferably a stabilised grade of polypropylene) which is either pigmented or coated with a solar radiation-absorbing colour, e.g. black. Water circulated through such a panel exposed to the sun may become warmer, and be used as a low grade heat supply suitable for heating e.g. swimming pools (where it may be convenient to use the pool's own pump to circulate the water being filtered, around the panel or preferably array of panels), greenhouses or buildings.

The heat exchangers may be used to supply heat to the environment, by circulating water which is warmer than the environment. The heat exchanger may, for example, be used as a radiator in a central heating system of a building, as a greenhouse heater, or even as a direct soil heater when buried in the soil of a greenhouse or cold frame. The water for such applications may be warmed by solar energy, collected for example by a further heat exchanger according to the invention when adapted as a solar collector as described above.

Figure 2:
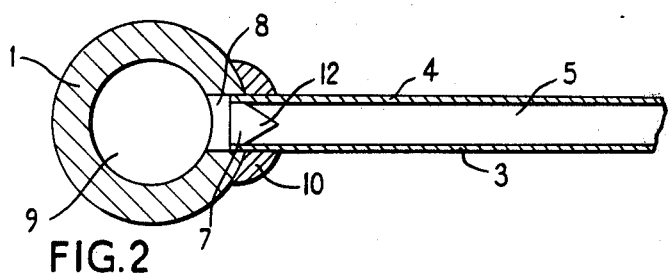
Figure 3:
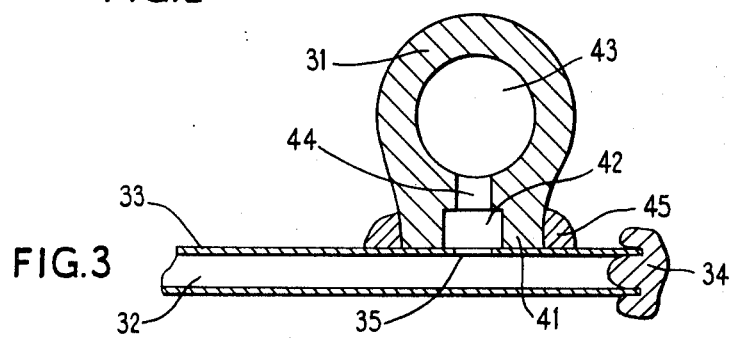
Figure 4:
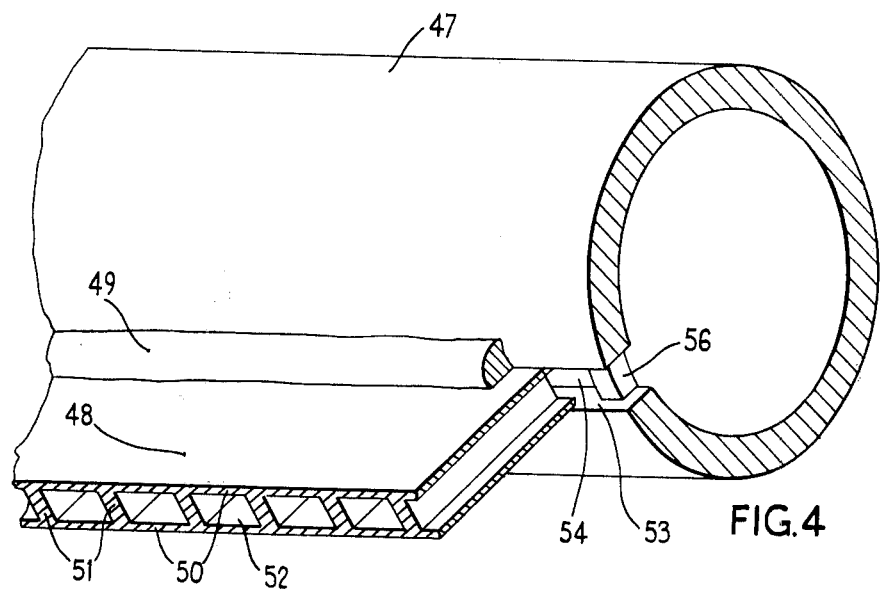
Figure 5:
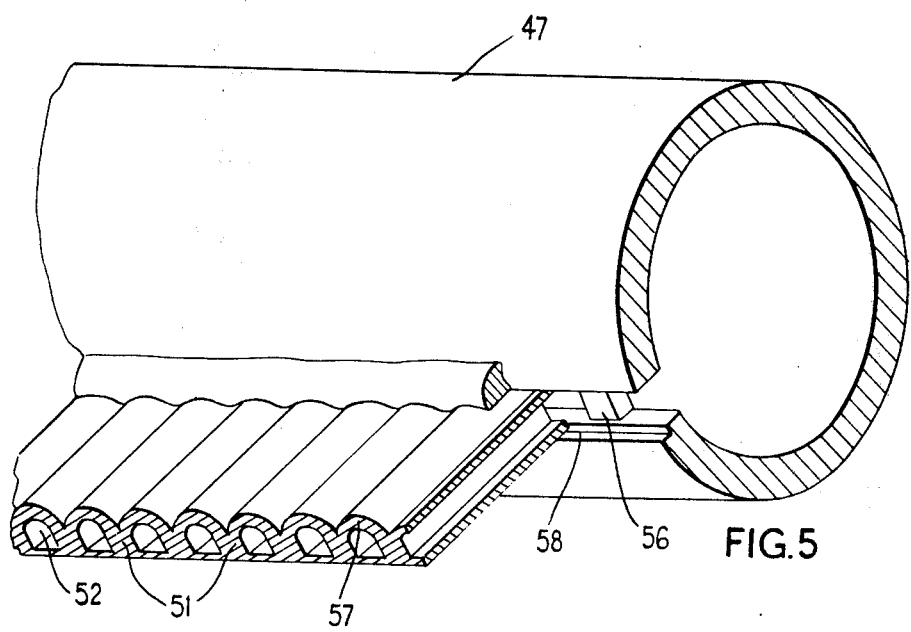
Figure 6:
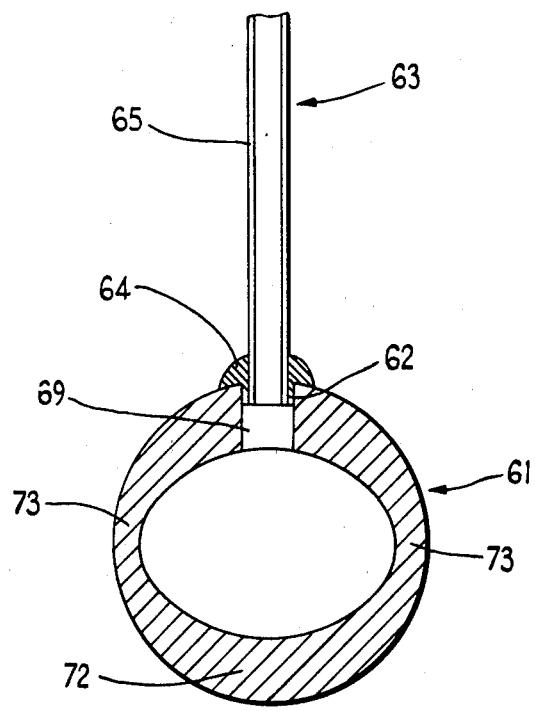
Figure 7:
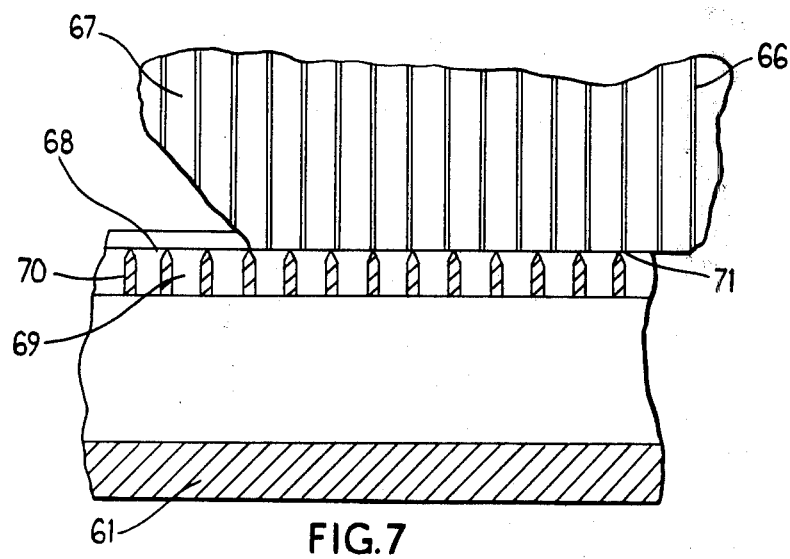

The invention is illustrated by various specific embodiments, described hereinafter by way of example with reference to the accompanying drawings in which FIG. 1 is a cut-away isometric view of an end portion of a heat exchanger in which the board extends radially from the header, FIG. 2 is a transverse section through one end of a further heat exchanger similar to that shown in FIG. 1, FIG. 3 is a transverse section through a further heat exchanger having a face-mounted header, FIGS. 4 and 5 are cut-away views of two further heat exchangers, and FIGS. 6 and 7 are mutually perpendicular sections through a still further heat exchanger.

The embodiment illustrated in FIG. 1 comprises a thick-walled polypropylene extruded tube 1 which forms the header, and an extruded board 2 extending radially from the header. The board comprises two spaced-apart sheets 3, 4 connected by a plurality of parallel webs 5 subdividing the space between the sheets into a plurality of parallel tubular passages 6 of rectangular section. The boards are extruded from polypropylene with the webs and sheets being extruded together as integral parts of a common extrudate. Running longitudinally along the header is a groove 7 milled into its external surface, the groove having a length and width substantially the same as the width and thickness respectively of the board. Spaced along the groove are a plurality of holes 8 interconnecting the groove and the interior 9 of the header. The end of the board is located along the mouth of the groove with the tubular passages opening into the groove. Along the angle formed between the header and the board is a sealing bead 10, which is fused to both parts, and not only holds them firmly together, but also seals the joint against escape of fluid. The board continues beyond the edge which has been sectioned to show the profile of the board, until it reaches a second header which is parallel to and substantially the same as that shown.

The heat exchanger is made by first milling the grooves 7 in the two headers, and drilling the row of holes along the base of each groove, through to the interior of the header. The headers and board are held in a jig with the ends of the board lying along the mouths of the two grooves, and polypropylene (e.g. a low ethylene composition) extruded as a bead progressively along the joint, into contact with the board and header, suitable melt temperatures being around 280° C. The extruder tip may be allowed to touch the header (but not the board) immediately prior to the bead of molten polymer. The molten polymer melts the surface of both the board and the header, and on cooling forms a firm weld to each.

In use, the headers are connected into an external circuit as required, and a fluid circulated through it. The fluid enters one header through an inlet at one end, passes through the holes into the groove, and thence into the tubular passages, running along the groove to become distributed to all the passages. After passing through the passages within the board, the fluid enters the groove in the second header, and passes through the holes into the interior of the second header, from which it is returned to the external circuit via an exit which is diagonally opposite the inlet on the other header.

A similar heat exchanger is shown in FIG. 2, and like numerals have been used for like parts. The only differences are that the board has been inserted into the groove, and a portion 12 has been cut out of the end of each web to allow the fluid to flow along the groove and distribute itself uniformly amongst the tubular passages.

The heat exchanger shown in FIG. 3 also comprises a tubular header 31 at each end of a board 32 extruded with a profile substantially as shown in FIG. 1. However, instead of the board extending radially from each header, the latter are mounted on one face 33 of the board. The ends of all the tubular passages through the board are closed by sealer 34 extruded into them (an alternative would be to clamp the ends of the sheets together in a heated press), and the board has a slot 35 cut out of the upper sheet adjacent the sealed ends, to provide access to the tubular passages. Mounted over the slots at either ends of the board are the headers 31 extruded with a profile specifically designed for the illustrated application. Thus while there is again a basic circular-sectioned pipe, there are also two integral longitudinal ridges 41 which are parallel and spaced apart sufficiently to provide a groove 42 between them. Interconnecting the groove and the interior 43 of the header, is a row of closely-spaced holes 44, and the headers are secured in place using a bead 45 of sealer extruded into place as described above. However, unlike the embodiments of FIGS. 1 and 2 in which a groove of the required length only was machined into the surface of the header, the groove of FIG. 3 being defined by the continuous integral ridges, extends continuously along the tube, and so extends beyond the edges of the board. The grooves must therefore be sealed where it so extends, e.g. with the sealer when securing the headers to the board.

Other fixtures may be secured to the heat exchanger in similar manner. Thus for example, mounting lugs may be extrusion welded to the boards or to the headers, if formed of a suitable thermoplastics material.

The heat exchanger shown in FIG. 4 is generally similar to that of FIG. 1, in comprising a tubular polypropylene header 47 welded to a polypropylene extruded board 48, by an extruded polypropylene bead 49. The board again comprises two spaced-apart sheets 50, the space between which is subdivided by a plurality of webs 51 to provide rectangular-sectioned tubular passages 52. Down the side of the header is a longitudinal groove 53 with holes 54 through to the interior 55 of the header, the material between the holes providing bridging portions 56.

The board 48 is inserted into the groove 53 whereby it is positively located during the welding process. The end of the board lies flush with the base of the groove, but unlike that shown in FIG. 2, the webs are not cut away to allow the fluid to flow freely along the groove. Instead, the rectangular-sectioned holes 54 through the header are closely spaced to give narrow bridging portions, and the tubular passages are fed directly with little flow (if any) along the groove.

The heat exchanger of FIG. 5 is similar to that of FIG. 4, except that the upper sheet 57 of the board is corrugated and provides a domed roof to each of the tubular passages. The configuration of this board is substantially as shown in FIG. 4 of British patent specification No. 1 042 732 referred to hereinabove. This configuration of board, however, is particularly suitable for use in solar energy collectors as the corrugated upper surface is effective for absorbing radiation as the angle of incidence varies throughout the day. Furthermore, polypropylene is degradable unless it contains at least a minimum effective amount of a suitable stabiliser, and most known stabilisers tend to be very slowly leached by warm water circulating through the heat exchanger. As this leaching can occur from both surfaces of the webs but only from one surface of the sheets, the provision of webs whose minimum thickness is at least twice that of the material separating the tubular passages from the surrounding environment, is also advantageous.

The use of thicker webs, however, may lead to poor flow distribution where flow must be direct from the holes to the passages due to blocking of the passages by the bridging portions 56. Accordingly a small step 58 is provided in one side of the groove to hold the board off the base of the groove during welding. Corresponding steps could equally be formed in both sides of the groove, but that is not generally much advantage with the corrugated configuration of board shown.

Alternatively, the bridging portion may be modified in a manner similar to that of the embodiment shown in FIGS. 6 and 7. That embodiment comprises a tubular header 61 having a longitudinal groove 62 in which is located the end of a hollow board 63. The board which is held in place by a bead 64, comprises two spaced-apart sheets 65 interconnected by integral webs 66. The webs divide up the space within the hollow board, into parallel tubular passages 67 of rectangular cross-section, which run from one header to the other.

The groove has a flat base 68 against which sits the end of the board. Through the header is a row of rectangular-sectioned holes 69, the material between the holes providing bridging portions 70. The bridging portions are chamfered at their outer surfaces to a knife edge 71 and the holes stretch the full width of the groove into which the board is inserted. Consequently the internal width of the tubular passages is less than that of the holes by an amount equal to the thickness of the two sheets making up the board, and also the clearance allowed either side of the board. The total cross-sectional area of the holes is substantially equal to the total cross-sectional area of the tubular passages so that flow through the passages will not be restricted on passing into the headers.

The bridging portions are important because they carry any stresses which may develop between the parts of the header on either side of the board, rather than the stresses being applied to either side of the relatively thin-walled board. The thickness of the bridging portions and other portions of the header wall are made sufficiently strong to withstand the expected stresses, e.g. the head of the circulating liquid at various temperatures. In the headers shown in FIGS. 1 and 2, the groove is milled out of the constant wall thickness, thereby considerably weakening the header along the line of the groove, and in consequence a thicker overall section is required. In FIG. 3, however, the header is shaped so that the groove lies external to the basic cylindrical shape, the thickness need be no more than that required to withstand the expected load together with the usual safety tolerances. Similarly, a header is shown in FIG. 6 whose configuration avoids undue wastage of material. In this header the wall thickness at the holes is sufficient to provide bridging portions capable of carrying the stresses developed in use, with a balancing portion 72 of similar thickness diametrically opposite. The two symmetrically-placed portions 73 between them are able to be made thinner without reducing their bursting strength below that at the holes.

I claim:

1. A heat exchanger of thermoplastics material comprising two spaced-apart headers interconnected by an extruded board having a profile comprising a plurality of tubular passages extending from one end of the board to the other; each tubular header having a longitudinal groove in its exterior surface and a plurality of holes spaced along the groove, the holes interconnecting the groove and the interior of the header; each end of the board being located along the groove of one of the headers; each header being held in position by a sealing bead adhering to both the header and the board, and extending continuously right round the mouth of the groove where covered by the board, the seal against loss of any fluid flowing between the header and the tubular passages of the board.

2. A heat exchanger according to claim 1 in which the grooves are sufficiently clear to permit free flow of fluid along them.

3. A heat exchanger according to claim 1 in which the wall of the header has a longitudinal portion which is thicker than an adjacent longitudinal element, and in which the groove is formed along the thicker longitudinal portion.

4. A heat exchanger according to claim 1 in which the holes are rectangular-sectioned and are arranged with adjacent sides substantially parallel.

5. A heat exchanger according to claim 1 in which the bridging portions between the holes are narrowed substantially to a knife edge at their outer surface.

6. A heat exchanger according to claim 1 in which the internal width of the tubular passages from one side of the board to the other is less than the width of the holes through the header by an amount such that the total cross-sectional area of the holes is substantially equal to or greater than the total cross-sectional area of the tubular passages.

7. A heat exchanger according to claim 1 in which the board is pigmented or coated with a solar radiation-absorbing colour.

8. A heat exchanger according to claim 1 in which the ends of the board are inserted at least part-way into the header grooves.

9. A heat exchanger according to claim 8 in which the width of the groove at its mouth is sufficiently wide to accommodate the end of the board but which narrows to 9 width insufficient to accommodate the board at a point part-way between the mouth of the groove and its base.

10. A heat exchanger according to claim 8 in which the end of the board is shaped such that part thereof is held clear of the base of the groove to allow free flow of fluid along the groove, by a further part thereof which extends to the base of the groove.

* * * * *